US012507620B2

(12) United States Patent
Heitkamp et al.

(10) Patent No.: US 12,507,620 B2
(45) Date of Patent: Dec. 30, 2025

(54) CUTTING MECHANISM COMPRISING A LEAF SPRING ROCKER ARM AS A CUTTING ELEMENT SUPPORT

(71) Applicant: Carl Geringhoff GmbH & Co. Kommanditgesellschaft, Ahlen (DE)

(72) Inventors: Alexander Heitkamp, Dülmen (DE); Christoph Hartmann, Ennigerloh (DE); Hans Pütter, Attendorn (DE); Steffen Sudhues, Ahlen (DE)

(73) Assignee: CARL GERINGHOFF GMBH & CO. KOMMANDITGESELLSCHAFT, Ahlen (DE)

( * ) Notice: Subject to any disclaimer, the term of this patent is extended or adjusted under 35 U.S.C. 154(b) by 490 days.

(21) Appl. No.: 18/181,320

(22) Filed: Mar. 9, 2023

(65) Prior Publication Data

US 2023/0284555 A1  Sep. 14, 2023

(30) Foreign Application Priority Data

Mar. 10, 2022  (DE) .......................... 102022105701.1

(51) Int. Cl.
*A01D 34/13*  (2006.01)
*A01D 34/04*  (2006.01)

(52) U.S. Cl.
CPC .............. *A01D 34/13* (2013.01); *A01D 34/04* (2013.01)

(58) Field of Classification Search
CPC ........ A01D 34/04; A01D 34/13; A01D 34/43; A01D 34/42; A01D 34/14; A01D 41/06; A01D 41/14; A01D 61/002; A01D 67/00

(Continued)

(56) References Cited

U.S. PATENT DOCUMENTS 3,896,610 A * 7/1975 Hiniker ................. A01D 41/14
56/15.8
4,091,602 A * 5/1978 Williams ............. A01D 41/141
56/11.1

(Continued)

FOREIGN PATENT DOCUMENTS

| EP | 3476200 A1 * | 5/2019 | ............. A01D 57/20 |
| EP | 3516941 A1 * | 7/2019 | ............. A01D 34/40 |
| WO | WO-2022020451 A1 * | 1/2022 | ............. A01D 34/40 |

*Primary Examiner* — Joseph M Rocca
*Assistant Examiner* — Sunny D Webb
(74) *Attorney, Agent, or Firm* — Kevin M. Kercher, Practus, LLP

(57) ABSTRACT

The present invention relates to a cutting mechanism (4) for attaching to a harvesting machine (2), comprising a frame (6) that is connected to a plurality of rocker arms (16) spaced apart from one another, facing in the working direction (A) and are movable vertically. In each case, a plurality thereof being configured at least in some portions as a leaf spring assembly (20) includes a plurality of leaf springs (22), and the front ends of these rocker arms (16) are connected in each case via a connecting component to knife angle bracket profiles (24), the cutting elements (18) of the cutting mechanism (4) being fastened thereto. For mounting of the knife angle bracket profiles (24), a connecting joint (26) with attachment means (28) on its sides facing transversely to the working direction (A) in order to connect an adjacent knife angle bracket profile (24) to connecting joint (26).

16 Claims, 11 Drawing Sheets

(58) Field of Classification Search
USPC .......................... 56/15.8, 257, 303, 320.1, 7
See application file for complete search history.

(56) References Cited

U.S. PATENT DOCUMENTS

| | | | | |
|---|---|---|---|---|
| 4,206,583 | A * | 6/1980 | Week | A01D 41/14 56/15.8 |
| 4,573,308 | A * | 3/1986 | Ehrecke | A01D 41/14 56/15.8 |
| 4,599,852 | A * | 7/1986 | Kerber | A01D 41/14 56/15.8 |
| 4,660,360 | A * | 4/1987 | Hardesty | A01D 41/14 56/15.8 |
| 9,148,999 | B2 * | 10/2015 | Fuechtling | A01D 43/06 |
| 9,622,409 | B2 * | 4/2017 | Coers | A01D 41/14 |
| 2010/0083629 | A1 * | 4/2010 | Klotzbach | A01D 41/14 56/320.1 |
| 2018/0139898 | A1 | 5/2018 | Shearer | |
| 2019/0014722 | A1 * | 1/2019 | Farley | A01D 34/02 |
| 2019/0124843 | A1 | 5/2019 | Augustine et al. | |
| 2022/0338415 | A1 | 10/2022 | Sudhues et al. | |

\* cited by examiner

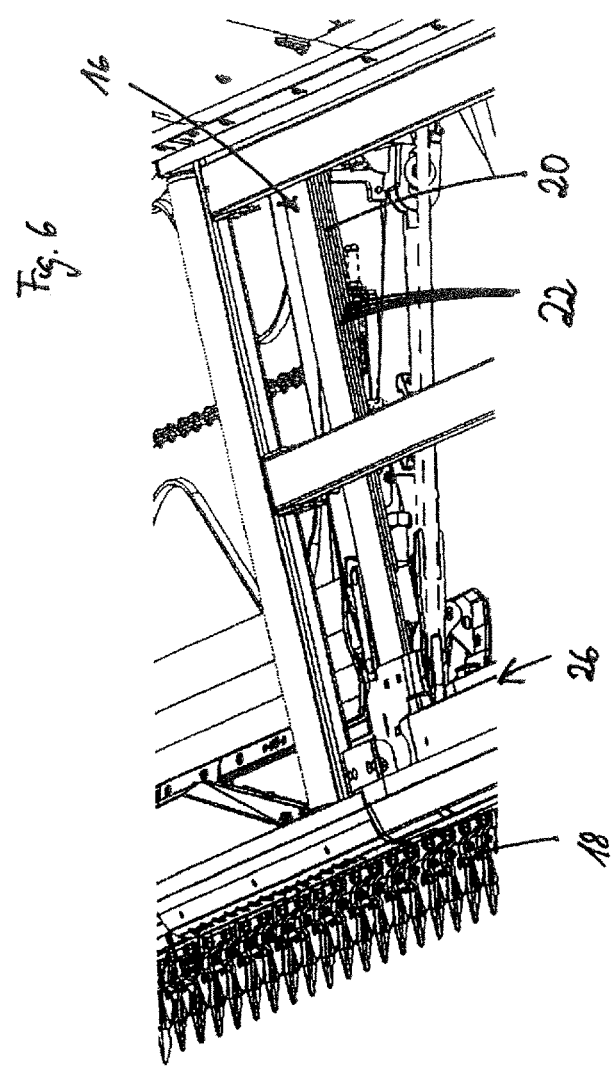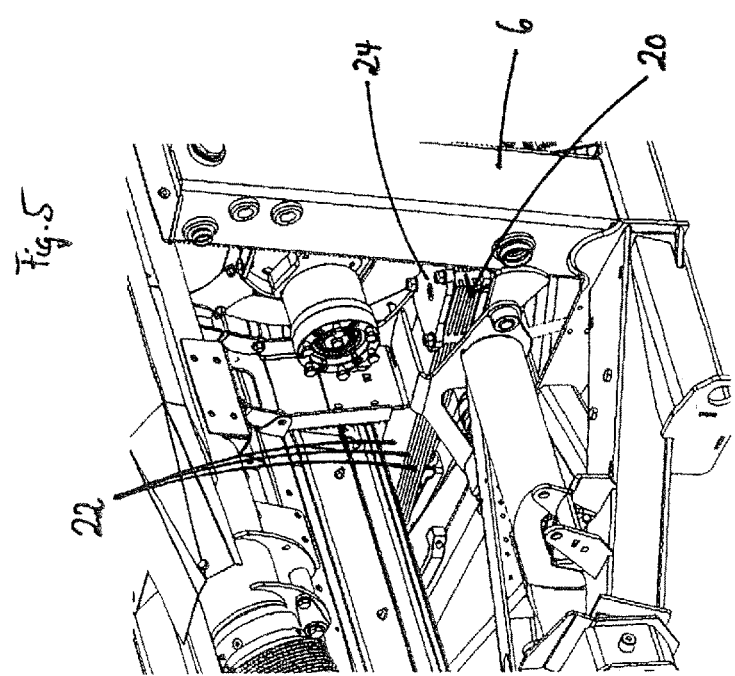

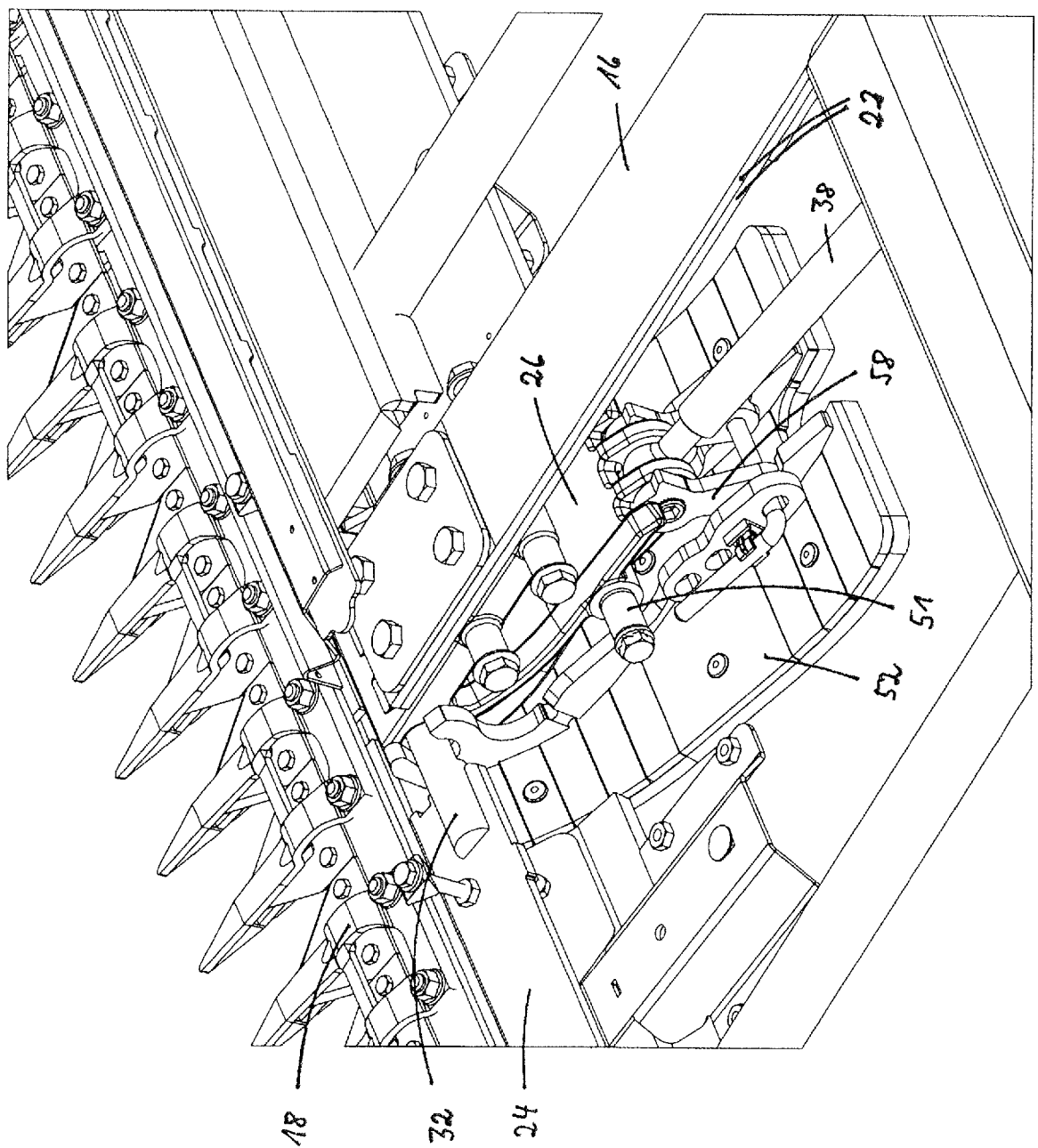

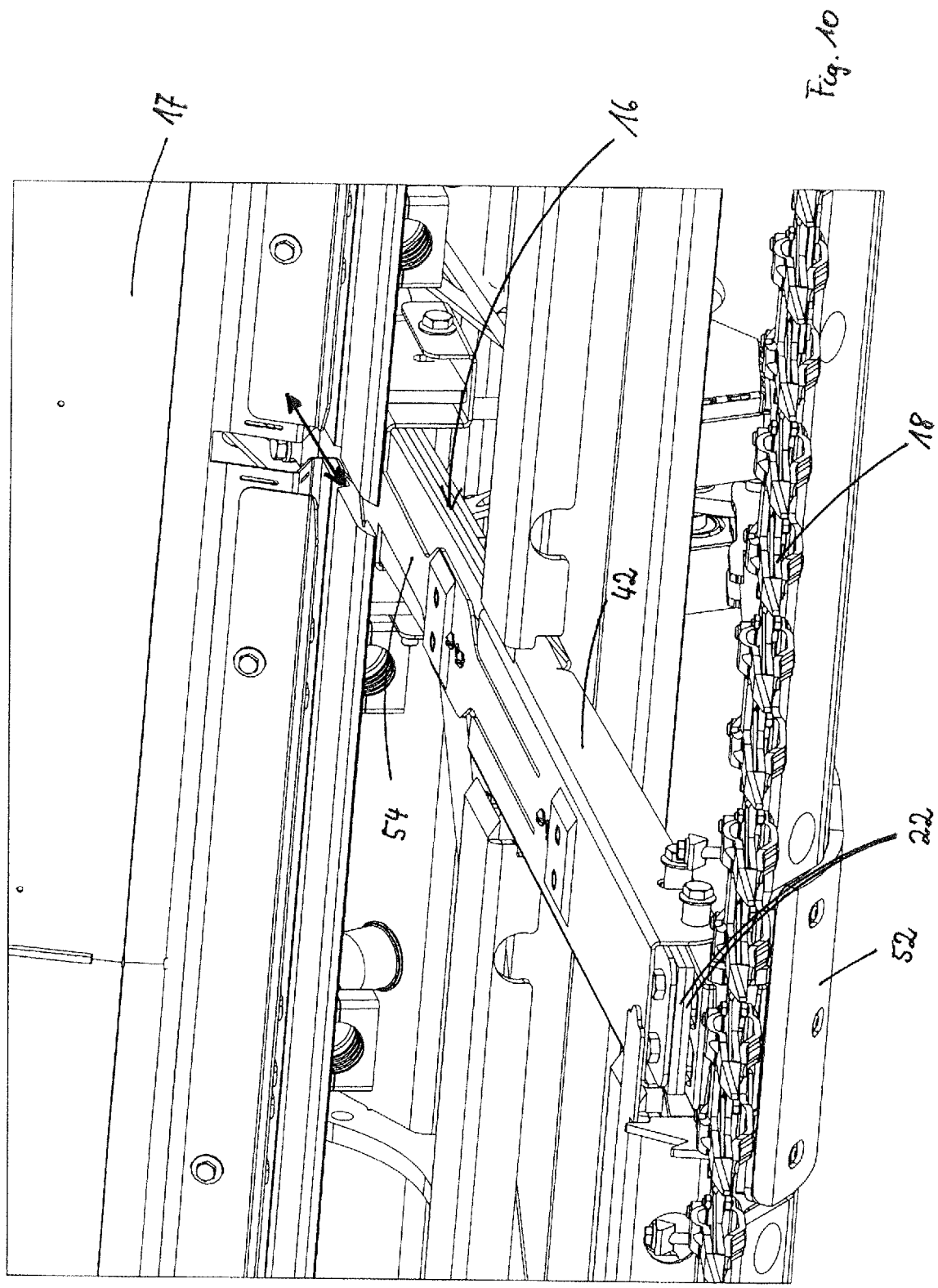

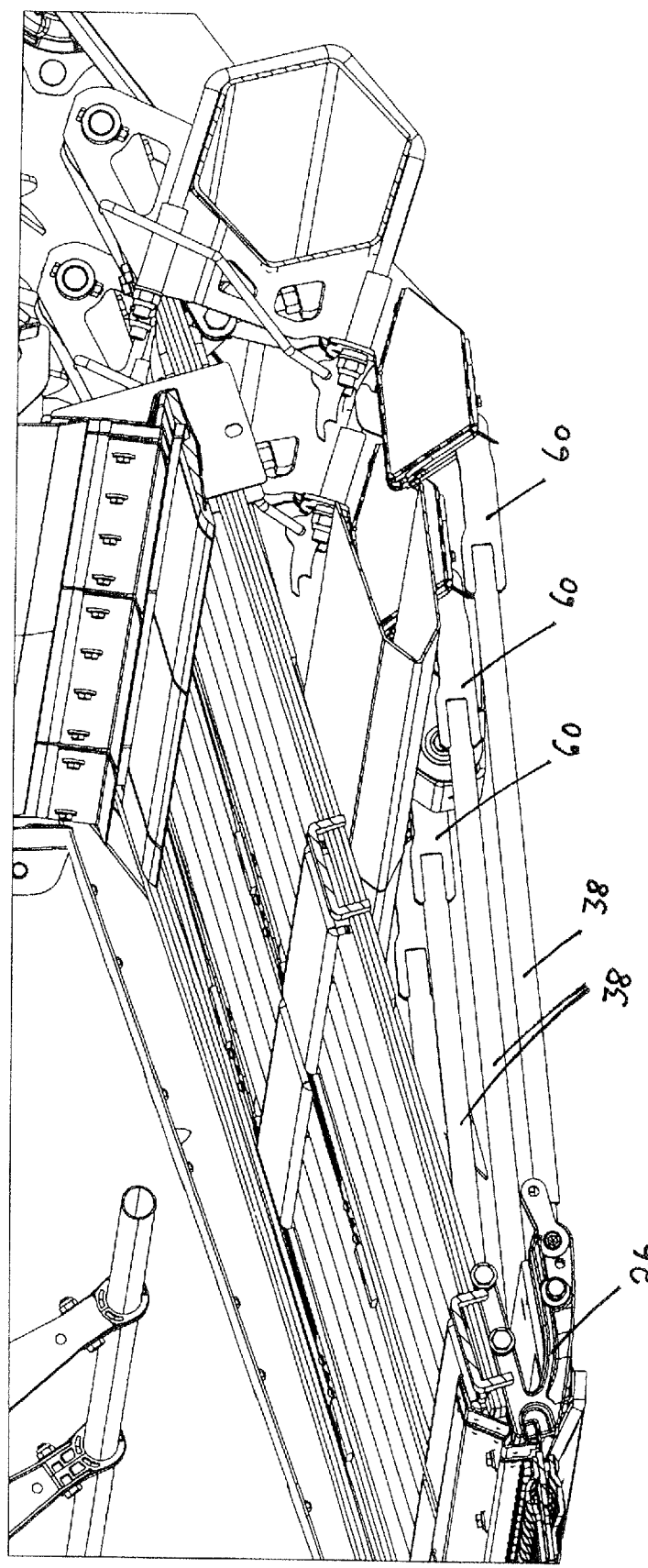

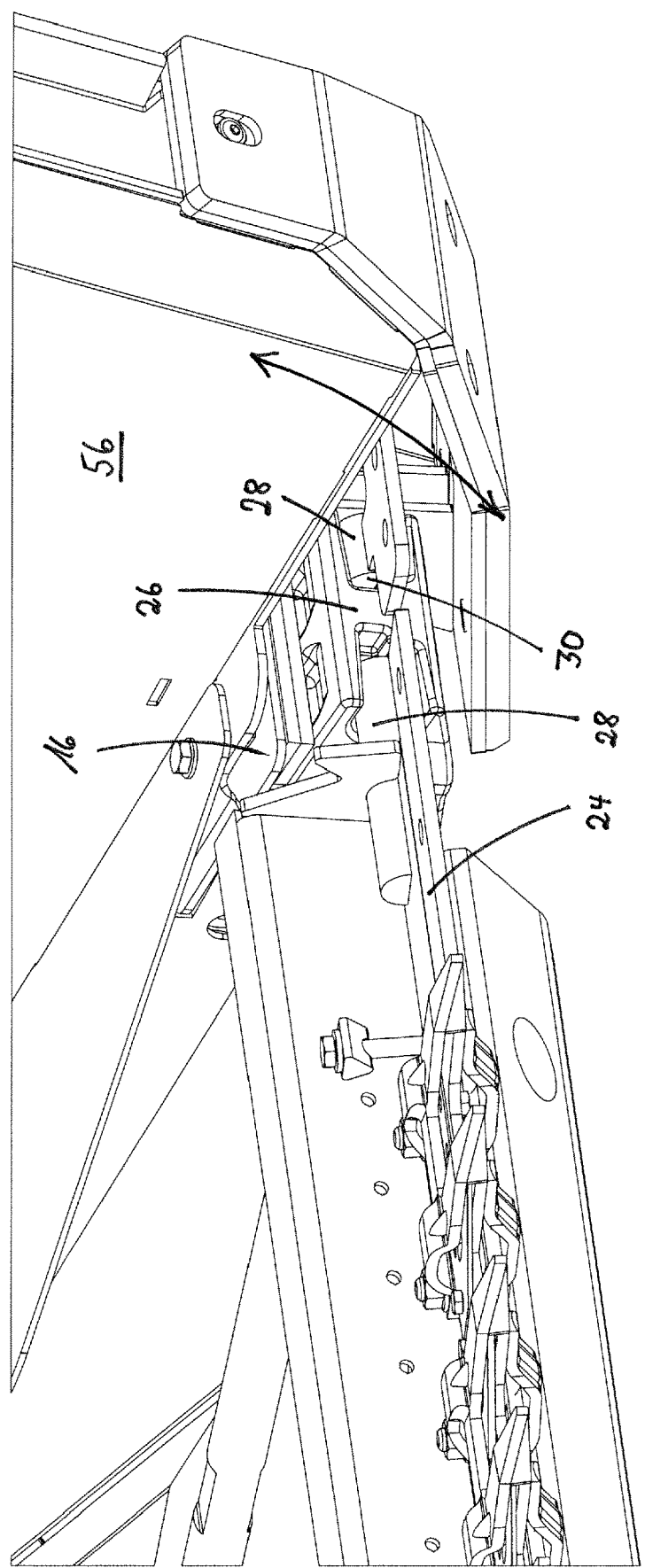

CUTTING MECHANISM COMPRISING A LEAF SPRING ROCKER ARM AS A CUTTING ELEMENT SUPPORT

CROSS REFERENCE TO RELATED APPLICATIONS

This application claims priority under 35 U.S.C. § 119 to German Patent Application DE 10 2022 105 701.1, filed Mar. 10, 2022, which is herein incorporated by reference in its entirety, including without limitation, the specification, claims, and abstract, as well as any figures, tables, appendices, or drawings thereof.

FIELD OF THE INVENTION

The present invention generally relates to a cutting mechanism for attaching to a harvesting machine.

BACKGROUND OF THE INVENTION

The background description provided herein gives context for the present disclosure. Work of the presently named inventors and aspects of the description that may not otherwise qualify as prior art at the time of filing are neither expressly nor impliedly admitted as prior art.

A cutting mechanism of the type in question is disclosed in the publication DE 10 2019 125 277 A1. In the cutting mechanism disclosed therein, adjacent rocker arms are connected together in each case at the front end thereof by a knife angle bracket profile which bridges the distance between the rocker arms. The rocker arms are thus connected in each case at the front end thereof to a first knife angle bracket profile which extends to the left transversely to the working direction, and to a second knife angle bracket profile which extends to the right transversely to the working direction. The connection of the free end of the rocker arm to the knife angle bracket profile is composed of a plurality of components and is complex to mount. The repair thereof is also complex if the knife angle bracket profile has been damaged in the case of an impact with a foreign body. Furthermore, in the case of an impact of the cutting mechanism with an obstruction, the many component connections can easily fail, which makes a more complex repair more likely.

Thus, there exists a need in the art for a cutting apparatus for a harvester machine that can be mounted and repaired in a cost-effective manner.

SUMMARY OF THE INVENTION

The following objects, features, advantages, aspects, and/or embodiments are not exhaustive and do not limit the overall disclosure. No single embodiment needs to provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further object to have a cutting mechanism for attaching to a harvesting machine, comprising a frame, which extends at least substantially over the working width of the cutting mechanism and which has an attachment frame comprising attachment means for connecting to an intake channel of a harvesting machine, wherein the frame is connected to a plurality of rocker arms which are arranged spaced apart from one another, which face in the working direction and which are movable at the front end thereof in the vertical direction, in each case a plurality thereof being configured at least in some portions as a leaf spring assembly composed of a plurality of leaf springs, and the front ends of these rocker arms are connected in each case via a connecting component to knife angle bracket profiles, the cutting elements of the cutting mechanism being fastened thereto.

It is the object of the present invention to provide a cutting mechanism comprising a mounting for the knife angle bracket profiles and the cutting elements fastened thereon, which can be mounted and repaired in a cost-effective manner. The construction should be designed to be as robust as possible in the case of an impact of the cutting mechanism with a foreign body. The cutting mechanism is also designed to be sufficiently flexible that it can be adapted with the cutting elements to uneven ground surfaces, even in partial widths of its working width, so that even in the case of uneven ground surfaces, the crop is still cut off at a distance from the ground which remains as uniform as possible across the working width of the cutting mechanism.

The object is achieved for a cutting mechanism of the type in question by the connecting component being configured as a connecting joint, which has attachment means on its sides facing transversely to the working direction in order to connect an adjacent knife angle bracket profile to the connecting joint thereby.

The connecting joint forms a component, which can be produced cost-effectively and which can be connected in a simple manner and with little effort to the rocker arm. The knife angle bracket profiles can be easily connected to the connecting joint via the lateral attachment means. When the cutting mechanism is mounted; initially a first connecting joint is connected to a first rocker arm before the knife angle bracket profiles are connected from the sides to the respective connecting joint. The individual knife angle bracket profiles can be mounted alternately with the connecting joints in a successive sequence outwardly from the machine center, consisting of connecting joint-knife angle bracket profile-connecting joint-knife angle bracket profile-etc. The components can be configured here such that in each case, they are merely plugged or pushed in a simple manner onto the retaining component in order to maintain a high degree of flexibility of the cutting mechanism for continuous adaptations to the ground contour. In the absence of a rigid and fixed connection, therefore, the components can still remain movable relative to one another. Furthermore, the connecting joint can be configured such that it generates high retaining forces in order to retain the attached components in their installed position, even if the cutting mechanism were to strike against a foreign body.

When the "front" or a "front end" of a component are discussed in this description, this is understood to mean the direction or the side of a component, which is located on the side facing in the working direction of the cutting mechanism. The working direction of the cutting mechanism is the direction in which it is moved into the standing crop for harvesting a crop. "Rear" or the "rear end" is understood to mean the direction or the side of the component which opposes the working direction. "Lateral" is understood to mean a direction that faces in a direction transversely to the working direction.

According to one embodiment of the invention, the connecting joint and the knife angle bracket profiles which are connected thereto are connected via positively configured pairs of attachment means which fit without clearance or virtually without clearance, wherein a first component of a pair is configured as a journal and a second component of a pair is configured as a receiving opening for receiving the journal. A plug-in mounting of the knife angle bracket profiles is possible due to the component pairing. Thus, for example, a connecting joint can have lateral receiving openings into which, in each case, a journal, which is fixedly connected to an associated knife angle bracket profile, is inserted into the receiving opening. When the journal fits in the receiving opening without clearance or virtually without clearance, the knife angle bracket profile is fixed in its installed position when the journal of the knife angle bracket profile located at the other end is then inserted into the next connecting joint and is retained therein without clearance or virtually without clearance in the connecting joint of the adjacent rocker arm. After such a mounting, the knife angle bracket profile is fixed at its two ends in a positionally accurate manner in its installed position without it requiring any mounting aids, such as screws, rivets, and the like, for the mounting. Naturally, it is also possible for the journals to be configured on the connecting joint and the receiving openings to be configured on the knife angle bracket profiles. The journal and the receiving opening can be configured cylindrically so that a rotation of the knife angle bracket profile about the longitudinal axis of the journal is possible. The receiving opening, however, can also be configured so as to taper conically toward the opening base, so that the journal can move more easily in the receiving opening, or the journal is configured to taper conically outwardly in order to permit this function. The components can, however, also be designed to be non-circular, for example, with an oval cross-sectional shape, whereby a rotational movement is blocked by the positive connection. In spite of the mounting without clearance or virtually without clearance, the individual segments of the cutting mechanism, which are formed by the knife angle bracket profiles, are movable relative to one another, at least to a limited extent in their partial working widths, since they are merely inserted into one another and are not rigidly connected together. This type of mounting simplifies the adaptation of the knife angle bracket profiles to the ground and, thus, also of the cutting element to an uneven ground contour.

According to one embodiment of the invention, a knife angle bracket profile is connected to the connecting joint via a torque support which is located on the rear face of the knife angle bracket profile and, which is connected to the connecting joint on a side of the connecting joint at a distance from the attachment means. The knife angle bracket profile is additionally supported on the connecting joint via the torque support. A lever force is used due to the distance of the connecting point, at which the torque support is connected to the connecting joint; from the attachment means, the attachment means being relieved of load thereby and the knife angle bracket profile being supported more effectively, thereby in the case of impacts with obstructions.

According to one embodiment of the invention, the connecting joint is produced as a cast part. A cast part is able to be produced cost-effectively and has a high degree of strength, and a plurality of functions can be readily integrated into the cast component mold without different parts having to be produced therefor and connected together. Moreover, since the cast parts do not have to be very large and the number thereof distributed over the working width of the cutting mechanism remains small, a potential weight drawback is still acceptable.

According to one embodiment of the invention, the connecting joint has a sickle-shaped basic shape with two limbs, which are arranged in an approximately V-shaped manner, and the connecting joint is installed in the cutting mechanism such that the attachment means for connecting the connecting joint to the knife angle bracket profiles are located in the front region of the connecting joint, and the outwardly returning strand of a belt conveyor conveying transversely to the working direction is guided through the rearwardly open intermediate space between the two limbs. Due to the sickle shape, it is possible to fasten the connecting joint to a rocker arm extending through the intermediate space between the leading and returning strand of a transversely conveying belt conveyor, and to support the connecting joint additionally by a support rod, which extends below the returning strand of the belt conveyor in an orientation parallel to the working direction of the cutting mechanism and which is supported on the frame of the cutting mechanism. The rocker arm, the connecting joint, and the support rod, which is supported in the lower region of the frame, in side view form a triangle through which the returning strand of a transversely conveying belt conveyor is guided. Due to the sickle shape of the connecting joint, the rocker arm and the support rod are connected to one another by only a single component which simplifies the mounting and provides a high degree of strength of the connection during the operation of the cutting mechanism. Since the connecting joint encompasses the lower strand of the transversely conveying belt conveyor, at least in some regions, the cutting mechanism can be designed to be very flat in the front region, whereby the crop pick-up is improved. The edge of the belt conveyor facing to the front is retained in a protected region behind the knife angle bracket profile, where it cannot be damaged and worn by contact with a foreign body. In order to avoid unnecessary wear of the belt conveyor, the upper edges of the lower limb can be chamfered so that the belt conveyor is not guided past the sharp edges of the limb.

According to one embodiment of the invention, a support plate is arranged laterally adjacent to the lower limb of the connecting joint, for supporting the returning strand of a transversely conveying belt conveyor. Due to the support plate, the returning strand is prevented from sagging on the lower face of the cutting mechanism and adjacent to the connecting joint. The support plate can be connected to the connecting joint in order to move in a synchronized manner with the movements thereof.

According to one embodiment of the invention, the connecting joint has a fastening bracket on its rear face, the connecting joint being connected thereby in a rotatably movable manner to a support rod, which extends in a plane below the associated rocker arm in the longitudinal direction of extent parallel to the working direction of the cutting mechanism, wherein the support rod at its end remote from the connecting joint is retained in a mounting which is supported on the frame and which permits a relative movement of the support rod with regard to the mounting. The rotatably movable connection of the support rod with the bracket permits vertical movements of the front free end of the rocker arm. For example, a sleeve receiver can be provided as the mounting on the frame, the end of the support rod which is remote from the connecting joint being inserted therein, or the support rod is designed to be hollow at its end remote from the connecting joint and plugged with the hollow receiver opening onto a guide pin. The sleeve receiver or the guide pin permits a relative movement of the support rod in the axial direction thereof. This support of the support rod on the frame of the cutting mechanism results in a cost-effective and maintenance-free longitudinally variable support of the rocker arm, which permits upward and downward movements of the rocker arm to a limited extent but can also serve as a stop with compression or rebound movements of the rocker arm when the end positions are reached in the sleeve receiver or with the guide pin. Moreover, the support rod damps the oscillating movements of the associated rocker arm due to a braking torque in the mounting caused by friction torque, so that this mounting is always retained in the vicinity of the ground, even in the case of uneven soil. Instead of a sleeve receiver, a slotted mounting or another longitudinally variable support of the support rod can also be used on the frame.

According to one embodiment of the invention, on its upper face, the connecting joint has connecting means, the connecting joint being connected thereby to the associated rocker arm. The connecting means can be, for example and in particular, screw channels, the connecting joint being able to be screwed thereby to the front end of the rocker arm. The connecting means are arranged in a staggered arrangement relative to one another in the working direction of the cutting mechanism, whereby an improved force distribution results when acting forces are transmitted from one component into the other. The connecting means can additionally be arranged offset to one another in the lateral direction. The upper face can define with the connecting means a flat plane onto which the lower face of the rocker arm to be connected to the connecting joint is positioned. Thus a particular shaping of the flat regions of the leaf springs, which are connected to the connecting joint, can be dispensed with. An extensive support of the connecting joint can be implemented on the downwardly facing flat side of the leaf spring on the lower face of the rocker arm via the flat plane on the upper face of the connecting joint, whereby the extensive force transmission between these components is improved, and the stress of the connecting means due to the acting forces is reduced. The connection can be designed to be fixed so that it no longer permits any relative movement between the rocker arm and the connecting joint after mounting, or it is designed to be movable so that relative movements between the components are still possible after mounting.

According to one embodiment of the invention, in the region of the connection to the connecting joint, the rocker arm has at least two layers of leaf springs, and the connection of the leaf springs of the rocker arm to the connecting joint is implemented via screw bolts which are guided from above through corresponding screw holes in the leaf springs into the connecting means in the connecting joint which are designed as screw channels, wherein the sizes of the screw holes in the uppermost leaf spring correspond to the diameter of the screw bolt shanks used, and the screw holes in the leaf spring or the leaf springs located there below are configured as slots, the longitudinal direction of extent thereof in the working direction of the cutting mechanism being longer than the diameter of the screw bolt shanks. The uppermost leaf spring and the connecting joint are fixedly connected together by the proposed screw connection. In order to avoid a stiffening of the rocker arm caused thereby; however, the slot which is configured in the leaf spring or in the leaf springs located there below still permits relative movements between the leaf springs, as are inevitably present with the vertical compression and rebound movements of the leaf springs of a rocker arm. If the sizes of the screw holes in the uppermost leaf spring correspond to the diameter of the screw bolt shanks used, the screw bolts are located without clearance or virtually without clearance in the screw holes. The screw bolts are retained in the screw holes by the screw heads, which bear against the upper face of the leaf springs. The slots, which are longer than the diameter of the screw bolt shanks, however, permit a relative movement of the leaf springs with regard to the screw bolts and the connecting joint.

According to one embodiment of the invention, the connecting joint has connecting means on its sides facing transversely to the working direction, the connecting joint being connected thereby to a push-on sleeve which is pushed onto the associated rocker arm. The push-on sleeve forms a type of collar, which serves to avoid buckling and shifting of the rocker arm with the knife angle bracket profile upwardly and to the rear, when a load acts thereon from the front or obliquely from below. The push-on sleeve extends in a direction parallel to the direction of the extent of the rocker arm and forms a torque support against the buckling of the leaf springs. In order to be able to fulfill this function, the push-on sleeve should extend at least over a quarter of the length of the rocker arm. For example, bores for a screw connection or other suitable connecting means, such as for example push-through sleeves or channels for receiving a push-through bolt, are considered as connecting means for connecting the connecting joint to the push-on sleeve. The push-on sleeve on its side facing the connecting joint is preferably provided with complementary connecting means, which permit a simple and rapid connection of the push-on sleeve to the connecting joint. The connection of the push-on sleeve to the connecting joint and/or the rocker arm can be designed to be fixed or movable.

According to one embodiment of the invention, the push-on sleeve is configured as a multi-limbed sheet metal profile, the lateral limbs thereof on their downwardly facing ends being connected together in each case by means of a connecting bolt on at least two points which are spaced apart from one another in the longitudinal direction of extent of the push-on sleeve, wherein the connecting bolts are arranged at a distance from the inner surface of the central limb of the sheet metal profile connecting together the lateral limbs, such that when a push-on sleeve is pushed onto the rocker arm, the free end of the rocker arm fits in the intermediate space between the connecting bolts and the inner surface of the central limb of the sheet metal profile. The connecting bolts prevent the push-on sleeve from being able to be lifted up away from the rocker arm. The connecting bolts can be positioned in terms of height such that they allow at least a small clearance to be free between the connecting bolts and the lower face of the inserted rocker arm. This facilitates a relative movement of the leaf springs of the rocker arm with regard to the push-on sleeve and, thus, the upward and downward oscillating movements of the rocker arm.

According to one embodiment of the invention, sliding elements are arranged on the inner face of the central limb of the sheet metal profile connecting together the lateral limbs and/or on the upper face of the portion of the rocker arm inserted into the push-on sleeve. The sliding elements serve to keep the breakaway torque small for the sliding movements of the push-on sleeve along the rocker arm. By reducing the contact surfaces of the components relative to one another, the tendency for corrosion in this region and the risk of an accumulation of dirt in the contact region is also reduced. The sliding elements can be produced from a ceramic or polymer material.

According to one embodiment of the invention, at its end opposing the working direction, the push-on sleeve is connected in a pivotably movable manner via a connecting rod to the rear wall of the cutting mechanism. The push-on sleeve serves in this manner as a pivot drive, the inclination angle of the rear wall in the working direction of the cutting mechanism being changed thereby according to the rocker arm movement during the compression and rebound movements of the rocker arm. Since with the upward and downward pivoting movements of the rocker arm, the transversely conveying belt conveyor is also lifted or lowered therewith in this region, without re-adjusting the rear wall, a gap would be created between the rear edge of the belt conveyor and the rear wall. The push-on sleeve, together with the connecting rod, ensure in this manner that the rear wall is always located at a suitably sealed distance from the rear edge of the transversely conveying belt conveyor. In particular, by pulling forward or pushing back the lower edge of the rear wall, this can be retained exactly on the rear edge of the transverse belt conveyors, although these transverse belt conveyors do move upward and downward with the rocker arms. In this manner, crop losses are avoided, which otherwise would occur due to an open gap between the rear edge of the transverse belt conveyors and the rear wall of the cutting mechanism.

According to one embodiment of the invention, a sliding plate which is connected to the connecting joint is arranged on the lower face of the connecting joint. The connection can be designed, in particular, to be height-adjustable and/or pivotably movable. The sliding plate serves to push the rocker arm up above the connecting joint when the ground profile is raised in the region of the rocker arm when travelling into the standing crop. It is avoided thereby that the rocker arm with the connecting joint is rammed into the ground at its front end when the ground contour rises in front of the cutting mechanism. If the connection is height-adjustable, the front end of the rocker arm can be retained at a selectively adjustable distance from the ground. If the sliding plate is connected in a pivotably movable manner to the connecting joint, during operation, the sliding plate can be adapted to the ground contour with the angle of attack at which it slides on the ground. The connecting joint is well suited for transmitting the occurring adjusting forces from the sliding plate to the rocker arm.

According to one embodiment of the invention, the sliding plate is connected to the connecting joint via a coupling rod which is fastened in a rotatably movable manner to the fastening bracket and, according to the rotational position, supports the sliding plate at a different angular position and/or vertical position relative to the connecting joint. The fastening bracket is well suited for transmitting the forces acting on the sliding plate onto the connecting joint. The coupling rod can be mounted on the same shaft as the support rod, whereby the mounting is simplified.

According to one embodiment of the invention, a side cladding of the cutting mechanism is connected to the connecting joint, which is fastened to the outermost rocker arm in the lateral direction. By the attachment of the side cladding to the rocker arm located at the outermost lateral end of the cutting mechanism, the side cladding is always located at a height, which is suitable for the respective vertical position of the rocker arm.

It is expressly pointed out that the above-described embodiments of the invention can be combined in each case individually, but also in any combinations with one another, with the subject matter of the main claim, provided that no technically compelling obstacles are in conflict therewith.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

Further modifications and embodiments of the invention can be derived from the following description of the subject matter and the drawings.

The invention is now to be explained in more detail with reference to exemplary embodiments.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

In the drawings:

FIG. 5 shows a detailed view of the leaf spring assembly of a rocker arm;

FIG. 6 shows a view of the fastening of knife angle bracket profiles to a connecting joint;

FIG. 9 shows a view obliquely from above of the connecting zone of the connecting joint to the sliding plate;

FIG. 10 shows a view from the front of a cutting mechanism in the region of a rocker arm;

FIG. 11 shows the frame-mounted support of the support rod in a mounting, and

FIG. 12 shows a view of a side cladding from the front.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
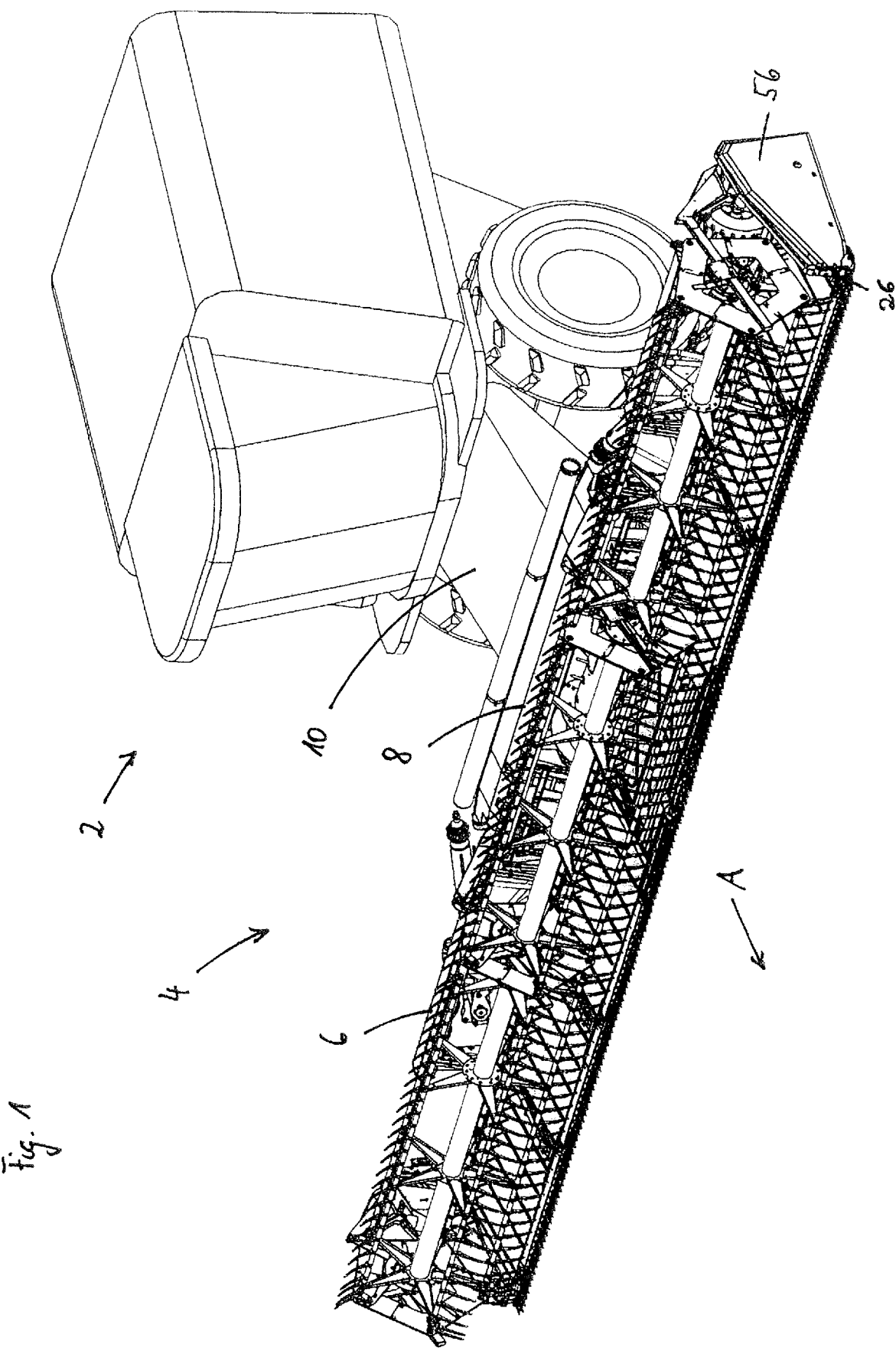
FIG. 1 shows a view obliquely from the front of a harvesting machine comprising a cutting mechanism.

A view obliquely from the front of a harvesting machine 2 comprising a cutting mechanism 4 is shown in FIG. 1. The cutting mechanism 4 has a frame 6, which is connected via an attachment frame 8 to the intake channel 10 of the harvesting machine 2. The side cladding 56 of the cutting mechanism 4 is fixedly connected to the connecting joint 26, which is fastened to the outermost rocker arm 16 in the lateral direction.

Figure 2:
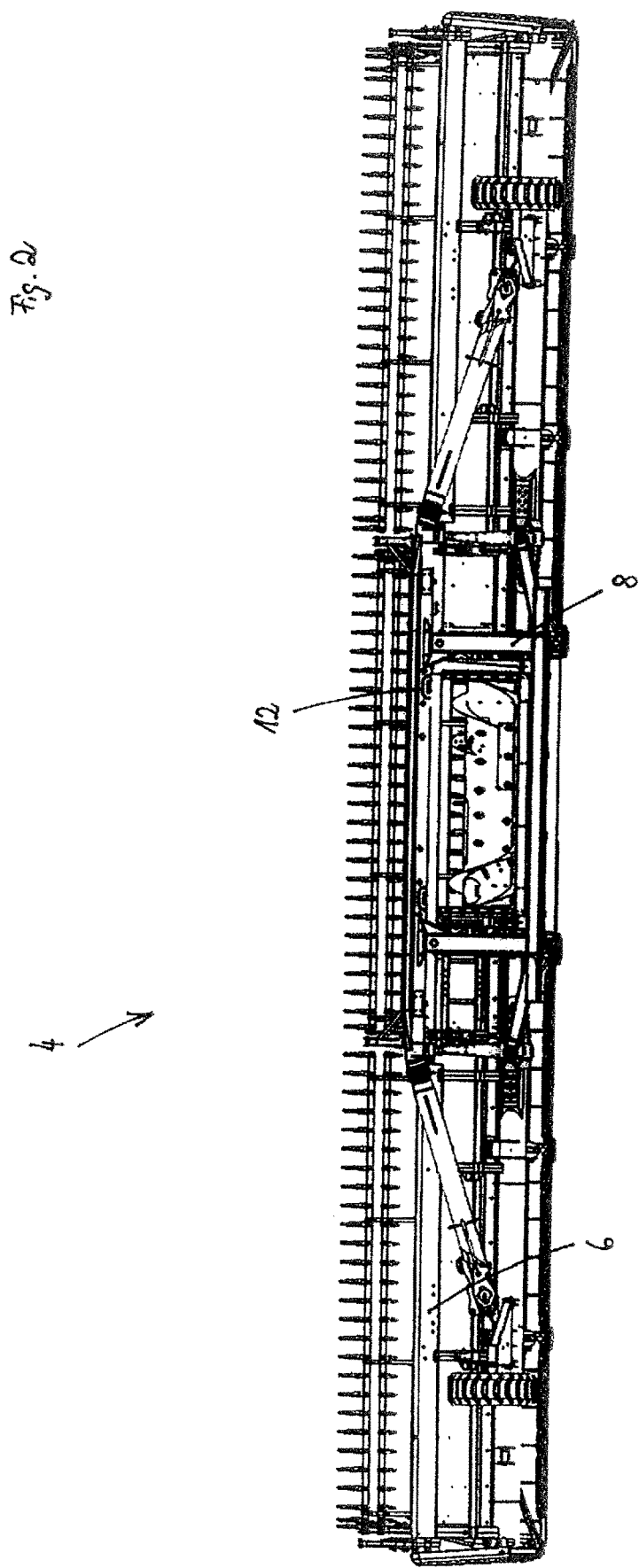
FIG. 2 shows a view of a cutting mechanism from the rear.

It can be identified from the view from the rear of the cutting mechanism 4 shown in FIG. 2 that attachment means 12, such as, for example, arrestor hooks, are arranged on the attachment frame 8, the cutting mechanism 4 being connected thereby to the harvesting machine 2. The cutting mechanism is steered in the working direction A into the standing crop.

Figure 3:
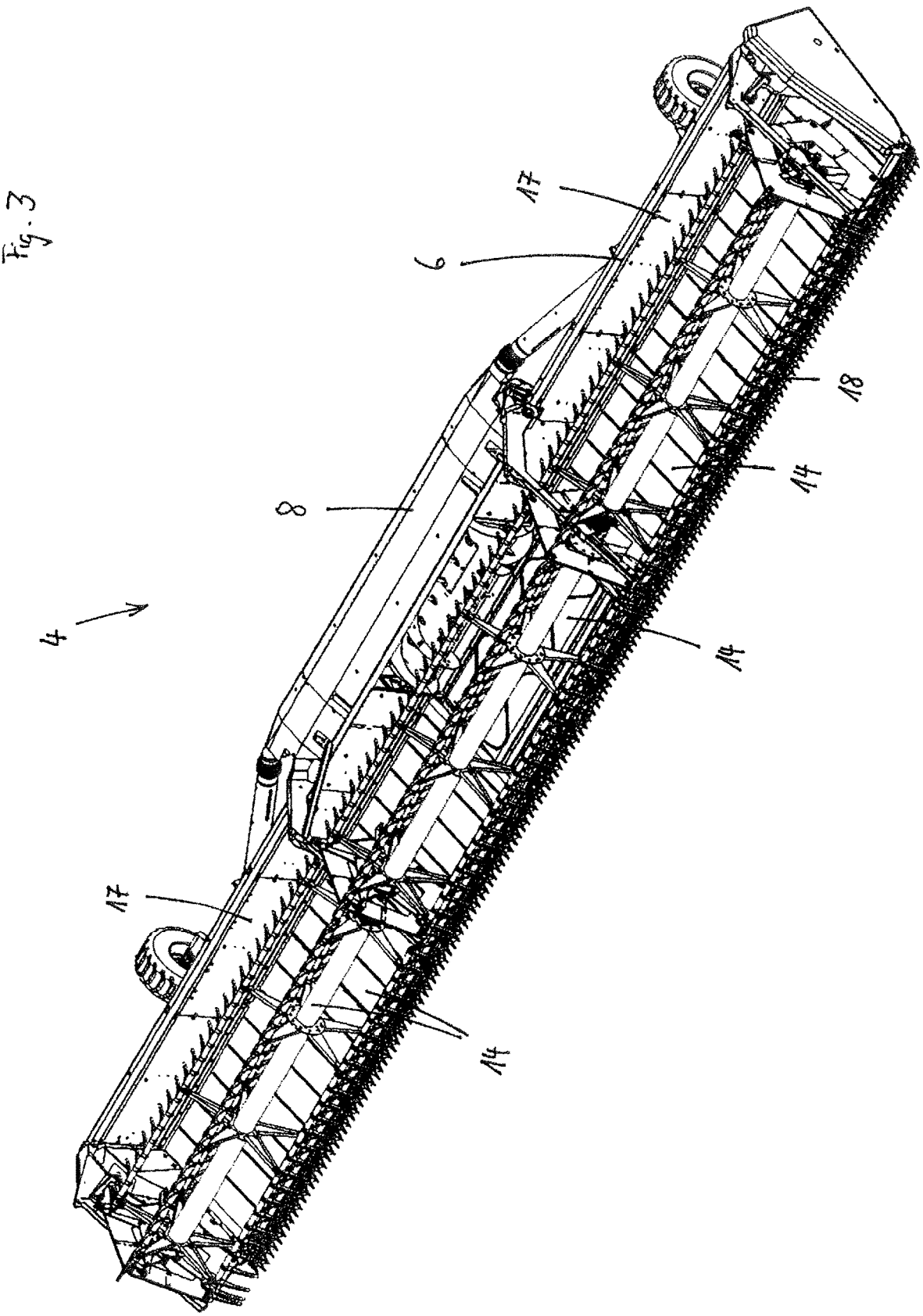
FIG. 3 shows a view of a cutting mechanism from a view obliquely from the front and above.

In FIG. 3 a view of a cutting mechanism 4 is shown from a view obliquely from the front and above. In this view, it can be identified that the cutting mechanism 4 has a number of conveying members 14. In the exemplary embodiment shown, the conveying members 14 are endlessly circulating conveyor belts of which two outer conveyor belts convey the cut crop to the center and eject the crop to a further centrally arranged conveyor belt, which transports the crop away to the rear in the direction of the intake channel 10 of the harvesting machine 2. Instead of the conveyor belts in the cutting mechanisms 4, for example, screw conveyors can also be used for transporting the crop away. Other conveying members are also conceivable. A reel is located as a further conveying member 14 above the ground-side conveying members 14, the reel being immersed into the standing crop with a rotating movement with the reel fingers and the rods to which the reel fingers are fastened, the reel supporting this crop whilst the stalks are cut off close to the ground, and after the cutting process depositing the stalks on the ground-side conveying members. The reel and the cutting mechanism are divided into three so that the cutting mechanism parts can be adapted more effectively to the ground contour.

A cutting element 18 in the form of a cutter bar is located on the front side of the cutting mechanism 4. The cutter bar is driven in an oscillating manner transversely to the working direction in order to cut the crop on the stems or stalks. Depending on the crop and the state thereof, it is desirable to guide the cutting element 18 as closely as possible to the ground in order to avoid crop losses. Thus, for example, in the case of soya, it is necessary to cut the stalks very close to the ground in order to avoid losses of soybeans. Similarly, in the case of laid grain, it is also advantageous to cut as closely as possible to the ground in order to avoid crop losses there. For a high straw yield, it is also advantageous to cut as closely as possible to the ground.

The cut crop is conveyed in the region of the lateral cutting mechanism parts with the conveying members 14 along the rear wall 17 of the cutting mechanism 4. The rear wall 17 is configured to be closed relative to the ground-side conveying members 14, in order to avoid crop losses there.

Figure 4:
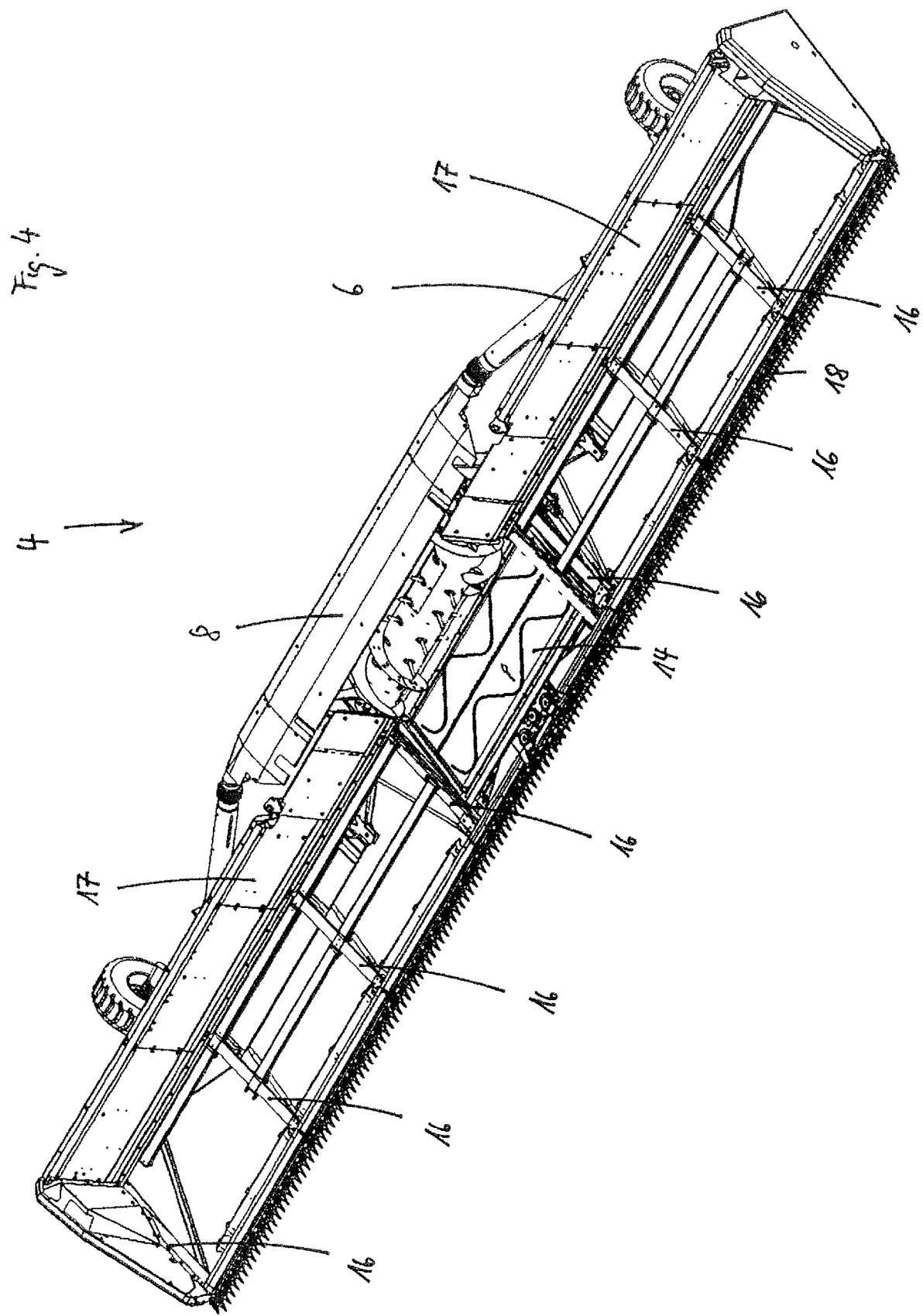
FIG. 4 shows a view of the cutting mechanism shown in FIG. 3 but without the conveying members.

In FIG. 4, a view of the cutting mechanism 4 illustrated in FIG. 3 is shown, wherein the conveying members have been omitted in the region of the side frame. As a result, in particular, it is possible to identify the rocker arms 16 on which the cutting element 18 is retained. The central conveyor belt can be seen as an example of a conveying member 14.

FIG. 5 shows a detailed view of the leaf spring assembly of a rocker arm. A plurality or all of the rocker arms 16 consist of leaf spring assemblies 20 which are composed of a plurality of leaf springs 22. A plurality or all of the leaf springs 22, which bear flat against one another, are held together on the frame 6 as a leaf spring assembly 20 on their frame-side end between clamping elements 23, as shown in FIG. 5. FIG. 6 shows a view of the fastening of knife angle bracket profiles 24 to a connecting joint 26. In FIG. 6, it can be identified that the cutting element 18 is fastened to knife angle bracket profiles 24, which in turn are retained on a connecting joint 26.

Figure 7:
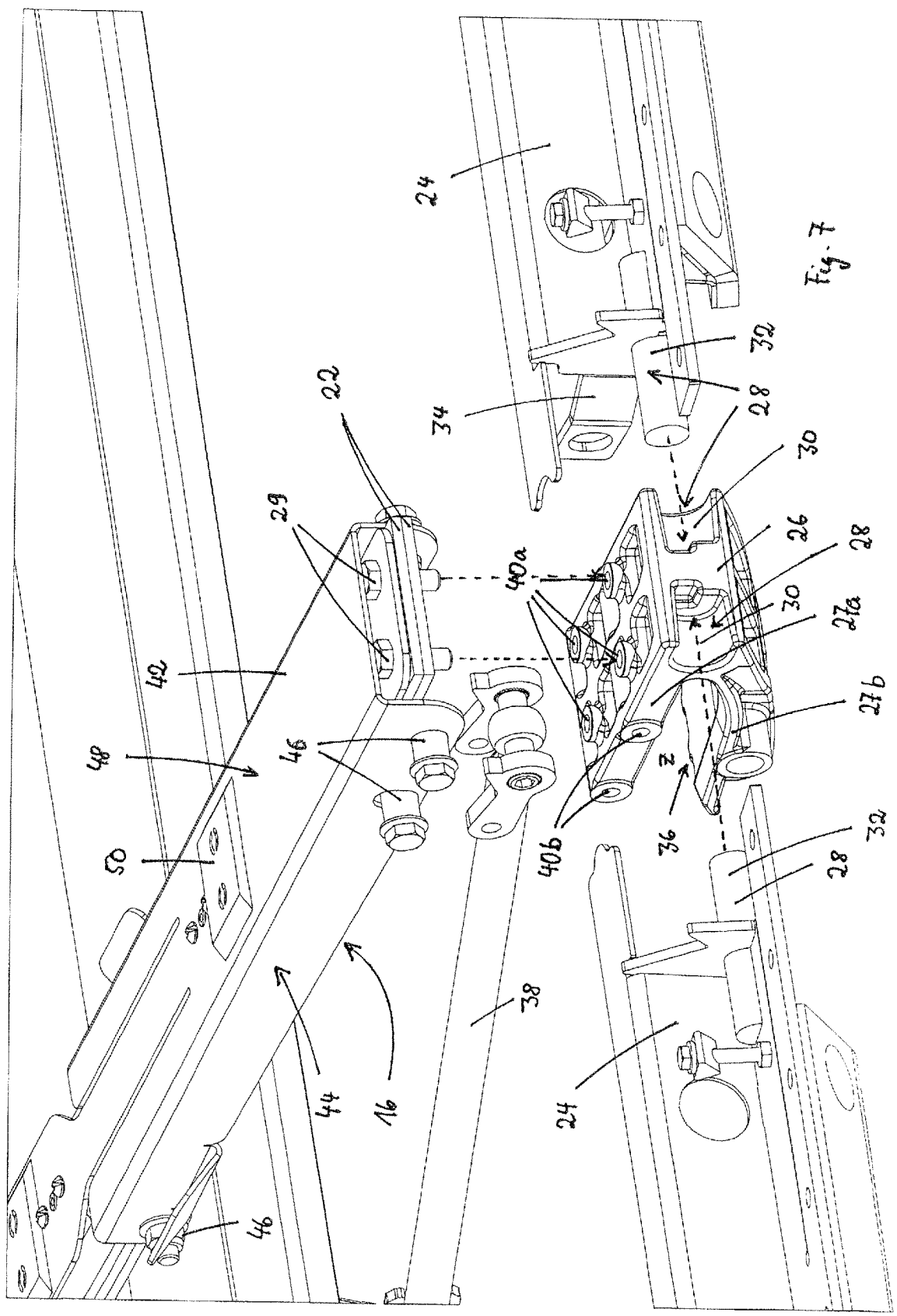
FIG. 7 shows an exploded drawing of a connecting joint with the components to be attached thereto obliquely from the front.
Figure 8:
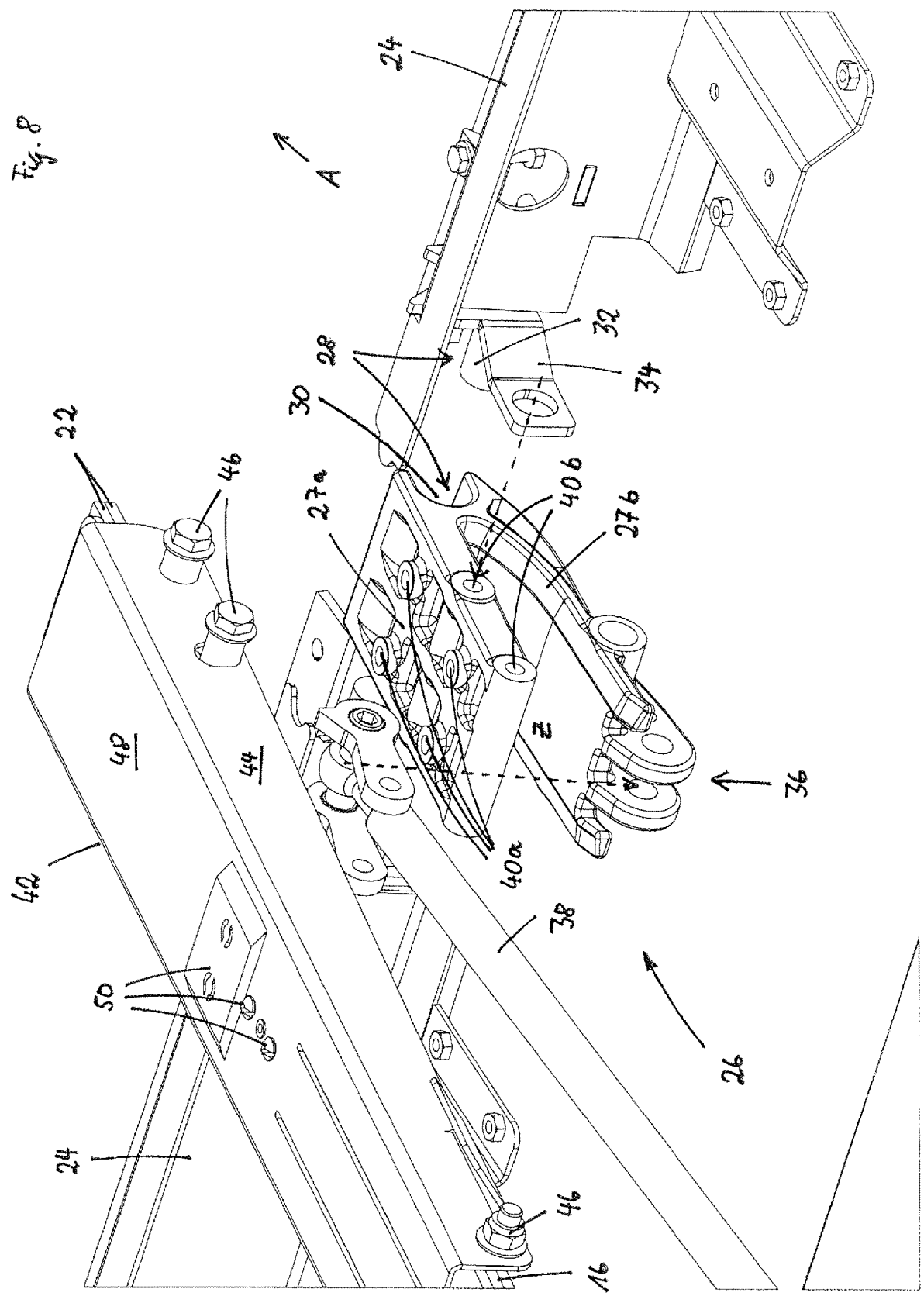
FIG. 8 shows an exploded drawing of a connecting joint with the components to be attached thereto obliquely from the rear.

FIG. 7 shows an exploded drawing of a connecting joint 26 with the components to be attached thereto obliquely from the front. FIG. 8 shows the connecting joint 26 with the components to be attached thereto obliquely from the rear. The connecting joint 26 is a connecting component, which serves, in particular, for mounting the knife angle bracket profiles 24 and the connection thereof to the rocker arm 16. The connecting joint 26 has a sickle-shaped basic shape with two limbs 27a and 27b arranged in an approximately V-shaped manner. The limbs 27a and 27b define therebetween an intermediate space Z which is open to the rear. The connecting joint 26 has on its sides facing transversely to the working direction attachment means 28 in order to connect thereby an adjacent knife angle bracket profile 24 to the connecting joint 26.

The connecting joint 26 has two receiving openings 30 as an example of attachment means 28, for receiving the journals 32, which are configured as an example of attachment means 28 on the knife angle bracket profiles 24. The receiving openings 30 and the journals 32 form positively configured pairs of attachment means 28, which fit without clearance or virtually without clearance and via which the connecting joint 26 can be connected to the knife angle bracket profiles 24. If the journals 32 are inserted into the receiving openings 30, the knife angle bracket profiles 24 are retained positively in the receiving openings 30.

The knife angle bracket profiles 24 have in each case, a torque support 34 via which they can be connected additionally to the connecting joint 26. The torque supports 34 are located in each case on the rear face of the knife angle bracket profiles 14. The torque supports are connected to the connecting joint, in each case on a side of the connecting joint 26 at a distance from the attachment means 28.

The connecting joint 26 is produced from a cast part.

The connecting joint 26 has on its rear face a fastening bracket 36, the connecting joint 26 being able to be connected thereby in a rotatably movable manner to a support rod 38. In the installed position in the cutting mechanism 4, the support rod 38 extends in a plane below the associated rocker arm 16 in the longitudinal direction of extent parallel to the working direction A of the cutting mechanism 4. In FIGS. 7 and 8, the respective mounting positions of the components relative to one another is displayed by dashed arrows.

The connecting joint 26 has on its upper face connecting means 40a (first connecting means) in the form of screw holes, the connecting joint 26 being able to be fixedly connected thereby to the associated rocker arm 16. This is implemented in the exemplary embodiment such that the rocker arm 16 has at least two layers of leaf springs 22 in the region of the connection with the connecting joint 26. Screw bolts 29 are inserted in corresponding screw holes in the leaf springs 22, the screw bolts being screwed along the dashed lines in FIG. 7 into the screw holes, which are located as connecting means 40a on the upper face of the connecting joint 26, for connecting the leaf springs 22 of the rocker arm 16 to the connecting joint 26. The sizes of the screw holes in the uppermost leaf spring 22 correspond to the diameter of the screw bolt shanks used, and the screw holes in the leaf spring or the leaf springs 22 located there below are configured as slots, the longitudinal direction of extent thereof in the working direction A of the cutting mechanism 4 being longer than the diameter of the screw bolts 29 inserted therein.

The connecting joint 26 has connecting means 40b (second connecting means) on its sides facing transversely to the working direction A, the connecting joint being fixedly connected thereby to a push-on sleeve 42, which is pushed onto the associated rocker arm 16. In the exemplary embodiment, the connecting means 40b are once again screw holes into which the connecting bolts 46 can be inserted or screwed, said connecting bolts being shown in FIGS. 7 and 8 in their installed position on the push-on sleeve 42.

In the exemplary embodiment, the push-on sleeve 42 is configured as a multi-limbed sheet metal profile, the lateral limbs 44 thereof being connected together in each case by one connecting bolt 46 on their downwardly facing ends, on at least two points spaced apart from one another in the longitudinal direction of extent of the push-on sleeve 42. The connecting bolts 46 are arranged at a distance from the inner surface of the central limb 48 of the sheet metal profile connecting together the lateral limbs 44, such that when a push-on sleeve 42 is pushed onto the rocker arm 16, the free end of the rocker arm 16 fits in the intermediate space between the connecting bolts 46 and the inner surface of the central limb 48 of the sheet metal profile, as shown in FIG. 7. The single rear connecting bolt 46 serves solely for the purpose of securing the push-on sleeve 42 against being lifted off. The two front connecting bolts 46 are screwed to the connecting joint 26, wherein the front connecting bolt 46 also secures the torque support 34 therewith.

Sliding elements 50 are arranged on the inner face of the central limb 48 of the sheet metal profile connecting together the lateral limbs 44, and on the upper face of the portion of the rocker arm 16 inserted into the push-on sleeve 42. Of the sliding elements 50 located on the inner face, in FIGS. 7 and 8, it is only possible to see the clip feet, which extend out onto the outer face of the sheet metal profile. The sliding elements 50, which are visible on the outer face, are also fastened to the sheet metal profile by clips, which extend as far as the inner face of the sheet metal profile.

FIG. 9 shows a view obliquely from above of the connecting zone of the connecting joint 26 to the sliding plate 52. The push-on sleeve 42 and the conveyor belts are not shown in FIG. 9. A sliding plate 52 which is connected to the connecting joint 26, is arranged on the lower face of the connecting joint 26. The connection is implemented via a pivot bolt 51 which is pushed through a sleeve receiver in the connecting joint 26, and on which the sliding plate 52 is rotatably mounted, and via a coupling rod 58, which is fastened in a rotatably movable manner to the fastening bracket 36, and according to the rotational position the sliding plate 52 is supported in a different angular position and/or vertical position relative to the connecting joint 26. A slotted guide is also arranged on the sliding plate 52, the sliding plate 52 being able to be fixed thereby to the coupling rod 58 in different pivoted positions.

FIG. 10 shows a view from the front of a cutting mechanism 4 in the region of a rocker arm 16. At its end opposing the working direction A, the push-on sleeve 42 is connected in a pivotably movable manner via a connecting rod 54 to the rear wall 17 of the cutting mechanism 4. With pulling or pushing movements of the connecting rod 54, the rear wall 17, in particular in the region of the lower edge, is moved along the double arrow illustrated in FIG. 10.

FIG. 11 shows the frame-side support of the support rod 38 in a mounting 60. The support rod 38 is held on its end remote from the connecting joint 26 in a mounting 60, which is supported on the frame, and which permits a relative movement of the support rod 38 with regard to the mounting 60.

In FIG. 12, a view of a side cladding 56 obliquely from the front is shown. The side cladding 56 of the cutting mechanism 4 is connected to the connecting joint 26, which is fastened to the outermost rocker arm 16 in the lateral direction. The connection is possible, for example, by the side cladding 56 being provided with a fastening bolt as attachment means 28, which is inserted in the outer receiving opening 30 of the connecting joint 26. The fastening bolt can rotate in the receiving opening such that a relative movement between the fastening bolt and the connecting joint is possible. If the rocker arm 16 moves upward and downward, the side cladding 56 also moves upward and downward at the same time therewith, as indicated by the double arrow. In order to permit the side cladding 56 to move upward and downward, at its end opposing the working direction, it can be movably, in particular rotatably movably, connected to the frame 6 of the cutting mechanism 2, for example, via the clamping element 23 to which the associated rocker arm 16 is fastened. The connection to the rocker arm 16 can be produced, for example, via a rubber joint.

The invention is not limited to the above-described exemplary embodiment. A person skilled in the art can modify the exemplary embodiment in a manner, which appears suitable by using the available specialist knowledge in order to adapt it to a specific application.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

List of Reference Characters

| | |
|---|---|
| 2 | Harvesting machine |
| 4 | Cutting mechanism |
| 6 | Frame (cutting mechanism) |
| 8 | Attachment frame |
| 10 | Intake channel |
| 12 | Attachment means |
| 14 | Conveying member |
| 16 | Rocker arm |
| 17 | Rear wall |
| 18 | Cutting element (cutter bar) |
| 20 | Leaf spring assembly |
| 22 | Leaf spring |
| 23 | Clamping element |
| 24 | Knife angle bracket profile |
| 26 | Connecting joint |
| 27 | Limb |
| 28 | Attachment means |
| 29 | Screw bolt |
| 30 | Receiving opening |
| 32 | Journal |
| 34 | Torque support |
| 36 | Fastening bracket |
| 38 | Support rod |
| 40a | First connecting means |
| 40b | Second connecting means |
| 42 | Push-on sleeve |
| 44 | Lateral limb |
| 46 | Connecting bolt |
| 48 | Central limb |
| 50 | Sliding element |

TABLE 1-continued

List of Reference Characters

| | |
|---|---|
| 51 | Pivot bolt |
| 52 | Sliding plate |
| 54 | Connecting rod |
| 56 | Side cladding |
| 58 | Coupling rod |
| 60 | Mounting |
| A | Working direction |
| Z | Intermediate space |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein, refers to slight variations in numerical quantities with respect to any quantifiable variable. Inadvertent error can occur, for example, through the use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes a structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A cutting mechanism (4) for attaching to a harvesting machine (2), comprising:
a frame (6) which extends at least substantially over the working width of the cutting mechanism (4) and which has an attachment frame (8) comprising attachment means (12) for connecting to an intake channel (10) of the harvesting machine (2), wherein the frame (6) is connected to a plurality of rocker arms (16) which are arranged spaced apart from one another, which face in a working direction (A) and which are movable at the front end thereof in the vertical direction, in each case a plurality thereof being configured at least in some portions as a leaf spring assembly (20) composed of a plurality of leaf springs (22), and the front ends of these rocker arms (16) are connected in each case via a connecting component to a knife angle bracket profile (24), a plurality of cutting elements (18) of the cutting mechanism (4) being fastened thereto, characterized in that the connecting component is configured as a connecting joint (26) which has attachment means (28) on its sides facing transversely to the working direction (A) in order to connect an adjacent knife angle bracket profile (24) to the connecting joint (26).

2. The cutting mechanism (4) according to claim 1, wherein the connecting joint (26) and the knife angle bracket profiles (24) which are connected thereto are connected via positively configured pairs of the attachment means (28) which fit without clearance or virtually without clearance, wherein a first component of a pair is configured as a journal (32) and a second component of a pair is configured as a receiving opening (30) for receiving the journal (32).

3. The cutting mechanism (4) according to claim 1, further comprising the knife angle bracket profile (24) that is connected to the connecting joint (26) via a torque support (34) which is located on the rear face of the knife angle bracket profile (24) and which is connected to the connecting joint on a side of the connecting joint (26) at a distance from the attachment means (28).

4. The cutting mechanism (4) according to claim 1, wherein the connecting joint (26) is produced as a cast part.

5. The cutting mechanism (4) according to claim 1, wherein the connecting joint (26) has a sickle-shaped basic shape with two limbs (27) which are arranged in an approximately V-shaped manner, and the connecting joint (26) is installed in the cutting mechanism (4) such that the attachment means (28) for connecting the connecting joint (26) to the knife angle bracket profiles (24) are located in the front region of the connecting joint (26), and the outwardly returning strand of a belt conveyor conveying transversely to the working direction (A) is guided through a rearwardly open intermediate space (Z) between the two limbs (27).

6. The cutting mechanism (4) according to claim 5, further comprising a support plate is arranged laterally adjacent to the lower limb (27) of the connecting joint (26), for supporting the returning strand of the transversely conveying belt conveyor.

7. The cutting mechanism (4) according to claim 1, wherein the connecting joint (26) has a fastening bracket (36) on its rear face, the connecting joint (26) being connected thereby in a rotatably movable manner to a support rod (38) which extends in a plane below the associated rocker arm (16) in the longitudinal direction of extent parallel to the working direction (A) of the cutting mechanism (4), wherein the support rod (38) at its end remote from the connecting joint (26) is retained in a mounting (60) which is supported on the frame and which permits a relative movement of the support rod (38) with regard to the mounting (60).

8. The cutting mechanism (4) according to claim 1, wherein on its upper face, the connecting joint (26) has a first connecting means (40a), the connecting joint (26) being connected thereby to the associated rocker arm (16).

9. The cutting mechanism (4) according to claim 8, wherein the region of the connection to the connecting joint (26), the rocker arm (16) has at least two layers of leaf springs (22), and the connection of the leaf springs (22) of the rocker arm (16) to the connecting joint (26) is implemented via screw bolts (29) which are guided from above through corresponding screw holes in the leaf springs (22) into a second connecting means (40b) in the connecting joint (26) which are designed as screw channels, wherein the sizes of the screw holes in the uppermost leaf spring (22) correspond to the diameter of the screw bolt shanks used and the screw holes in the leaf springs (22) located there below are configured as slots, the longitudinal direction of extent thereof in the working direction (A) of the cutting mechanism (4) being longer than the diameter of the screw bolt shanks (29).

10. The cutting mechanism (4) according to claim 1, wherein the connecting joint (26) has a second connecting means (40b) on its sides facing transversely to the working direction (A), the connecting joint being connected thereby to a push-on sleeve (42) which is pushed onto the associated rocker arm (16).

11. The cutting mechanism (4) according to claim 1, wherein a push-on sleeve (42) is configured as a multi-limbed sheet metal profile, a lateral limb (44) thereof on their downwardly facing ends being connected together in each case by means of a connecting bolt (46) on at least two points which are spaced apart from one another in the longitudinal direction of extent of the push-on sleeve (42), wherein the connecting bolts (46) are arranged at a distance from the inner surface of a central limb (48) of the sheet metal profile connecting together the lateral limbs (44), such that when the push-on sleeve (42) is pushed onto the rocker arm (16), a free end of the rocker arm (16) fits in an intermediate space (Z) between the connecting bolts and an inner surface of the central limb (48) of the sheet metal profile.

12. The cutting mechanism (4) according to claim 11, wherein a sliding element (50) are arranged on the inner face of the central limb (48) of the sheet metal profile connecting together the lateral limbs (44) and/or on an upper face of the portion of the rocker arm (16) inserted into the push-on sleeve (42).

13. The cutting mechanism (4) according to claim 11, wherein at its end opposing the working direction (A) the push-on sleeve (42) is connected in a pivotably movable manner via a connecting rod (54) to a rear wall (17) of the cutting mechanism (4).

14. The cutting mechanism (4) according to claim 1, further comprising a sliding plate (52) which is connected to the connecting joint (26) and is arranged on a lower face of the connecting joint (26).

15. The cutting mechanism (4) according to claim 1, wherein a sliding plate (52) is connected to the connecting joint (26) via a coupling rod (58) which is fastened in a rotatably movable manner to a fastening bracket (36), and according to the rotational position supports the sliding plate (52) at a different angular position and/or vertical position relative to the connecting joint (26).

16. The cutting mechanism (4) according to claim 1, further comprising a side cladding (56) of the cutting mechanism (4) that is connected to the connecting joint (26), which is fastened to the outermost rocker arm (16) in the lateral direction.

* * * * *